United States Patent Office 3,850,916
Patented Nov. 26, 1974

3,850,916
7-AMINO - 3-[S-(1,2,3 - TRIAZOLE - 5-YL)-THIO-METHYL]-3-CEPHEM - 4 - CARBOXYLIC ACID AND SALTS THEREOF
Leonard Bruce Crast, Jr., Clay, N.Y., assignor to Bristol-Myers Company, New York, N.Y.
No Drawing. Application July 29, 1971, Ser. No. 167,534, now Patent No. 3,759,904, dated Sept. 18, 1973, which is a continuation-in-part of abandoned application Ser. No. 107,448, Jan. 18, 1971. Divided and this application Mar. 26, 1973, Ser. No. 345,031
Int. Cl. C07d 99/24
U.S. Cl. 260—243 C      2 Claims

ABSTRACT OF THE DISCLOSURE

7-[D-($\alpha$ - amino - $\alpha$ - phenylacetamido)]-3-[S-(1,2,3-triazole - 5 - yl)thiomethyl]-3-cephem-4-carboxylic acid and its nontoxic, pharmaceutically acceptable salts are valuable as antibacterial agents, as nutritional supplements in animal feeds, as agents for the treatment of mastitus in cattle and as therapeutic agents in poultry and animals, including man, and are especially useful in the treatment, particularly by oral administration, of infectious diseases caused by many Gram-positive and Gram-negative bacteria.

CROSS-REFERENCE TO RELATED APPLICATIONS

This application is a divisional of my prior co-pending application Ser. No. 167,534, filed July 29, 1971 and issued Sept. 18, 1973 as U.S. Pat. 3,759,904 which was in turn co-pending and a continuation-in-part of my prior co-pending application Ser. No. 107,448, filed Jan. 18, 1971 and now abandoned.

BACKGROUND OF THE INVENTION (1) Field of the invention

The cephalosporins of the present invention possess the usual attributes of such compounds and are particularly useful in the treatment of bacterial infections by oral administration.

(2) Description of the prior art

Cephalothin and cephaloridine are well-known antibacterial agents; see U.S. Pats. 3,218,318; 3,449,338 and 3,498,979. The literature also contains considerable data on the activity of cephaloglycin and cephalexin; see U.S. Pats. 3,303,193 and 3,507,861 and Great Britain 985,747 and 1,054,806. Newer cephalosporins include cefazolin and cephapirin; see U.S. Pat. 3,516,997 [and also Netherlands 6805179 (Farmdoc 34,328) and South Africa 68/4,513] and U.S. Pat. 3,422,100.

The literature on cephalosporins has been reviewed by E. P. Abraham, Quart. Rev. (London), 21, 231 (1967) by E. Van Heyningen, Advan. Drug. Res., 4, 1–70 (1967) and briefly in Annual Reports in Medicinal Chemistry, Academic Press, Inc., 111 5th Ave., New York, N.Y. 10003, by L. C. Cheney on pp. 96 and 97 (1967) and by K. Gerzon and R. B. Morin on pp. 90–93 (1968) and by Gerzon on pp. 79–80 (1969). New cephalosporins are frequently reported at the annual Interscience Conference on Antimicrobial Agents and Chemotherapy as illustrated by Sassiver et al., Antimicrobial Agents and Chemotherapy—1968, American Society for Microbiology, Bethesda, Md., pp. 101–114 (1966) and by Nishida et al., ibid., 236–243 (1970). Two excellent recent reviews are The Cephalosporins; Microbiological, Chemical and Pharmacological Properties and Use in Chemotherapy of Infection, L. Weinstein and K. Kaplan, Annals of Internal Medicine, 72, 729–739 (1970) and Structure Activity Relationships Among Semisynthetic Cephalosporins, M. L. Sassiver and A. Lewis, Advances in Applied Microbiology, edited by D. Perlman, 13, 163–236 (1970), Academic Press, New York.

The preparation of various 7-[$\alpha$-amino-arylacetamido]-cephalosporanic acids and the corresponding desacetoxy compounds in which aryl represents unsubstituted or substituted phenyl or 2- or 3-thienyl is described, for example, in British specifications 985,747, 1,017,624, 1,054,806 and 1,123,333, in Belgium Pat. 696,026 (Farmdoc No. 29,494), in U.S. Pats 3,311,621, 3,352,858, 3,489,750, 3,489,751, 3,489,752 and 3,518,260, in Japanese Pat. 16,871/66 (Farmdoc 23,231), by Spencer et al., J. Med. Chem., (95), 746–750 (1966), by Ryan et al., J. Med. Chem. 12, 310–313 (1969) and by Kurita et al., J. Antibiotics (Tokyo) (A) 19, 243–249 (1966) and see also U.S. Pat. 3,485,819.

Netherlands Pats. 6811676 (Farmdoc 36,349) and 6812382 (Farmdoc 36,496) and U.S. Pats. 3,489,750 and 3,489,751 disclose ring-substituted cephaloglycins.

Various 7-[$\alpha$-amino-arylacetamido]cephalosporins in which one hydrogen of the $\alpha$-amino group is replaced by a carbonyl group which is attached in turn to another moiety have been reported. The earliest were the cephaloglycin and cephalexin precursors in which use was made of a common peptide blocking group such as carbobenzyloxy as illustrated by U.S. Pat. 3,364,212, Belgian Pat. 675,298 (Farmdoc 22,206), South African Pat. 67/1,260 (Farmdoc 28,654) and Belgian Pat. 696,026 (Farmdoc 29,494). Related compounds include those of U.S. Pats. 3,303,193 and 3,311,621 and 3,518,260.

Various cephalosporins, including cephalosporin C on occasion but not cephaloglycin, have been reacted with nucleophilic, aromatic mercaptans to produce compounds having the structure

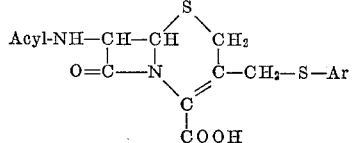

In U.S. Pat. 3,278,531 Ar is phenyl or certain substituted phenyls or certain aromatic heterocyclic rings named, for example, in column 5. Similar nucleophiles, e.g. 2-mercaptopyrimidines, are disclosed in U.S. 3,261,832 and Great Britain 1,101,422 and U.S. 3,479,350 and U.S. 3,502,665, all issued to Glaxo. A parallel disclosure is found in Great Britain 1,109,525 to Ciba, e.g. in definition "h" for $R_3$. Additional nucleophiles of this type were disclosed by Fujisawa in Belgium 714,518 (Farmdoc 35,307; Netherlands 6806129 and South Africa 68/2,695), in Canada 818,501 (Farmdoc 38,845), in Great Britain 1,187,323 (Farmdoc 31,936; Netherlands 6714888), in U.S. 3,530,-123 and in U.S. 3,516,997 (Farmdoc 34,328; Netherlands 6805179) which includes the compound named cefazolin, which has a tetrazolylacetyl sidechain on the 7-amino group and a 5-methyl-thiadiazolylthiomethyl group at the 3-position and is described at some length in the scientific literature, e.g. in Antimicrobial Agents and Chemotherapy—1969, American Society for Microbiology, Bethesda, Md., at pp. 236–243 and in J. Antibiotics (Japan), 23(3), 131–148 (1970).

Various cephalosporins having the structure

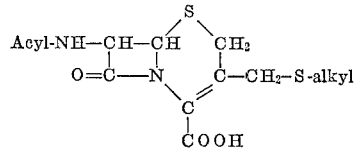

in which acyl represents various sidechains including $\alpha$-aminophenylacetyl have been described in some of the above and by Glaxo in Belgium 734,532 (Farmdoc 41,619) and in Belgium 734,533 (Farmdoc 41,620).

Cephalosporins having the structure

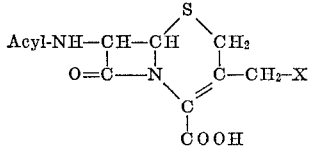

where X includes

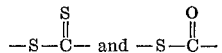

are disclosed in some of the above and in U.S. 3,239,515, 3,239,516, 3,243,435, 3,258,461, 3,413,259 and 3,446,803.

Related publications in the scientific literature include J. Med. Chem., 8, 174–181 (1965) and J. Chem. Soc. (London), 1595–1605 (1965), 5015–5031 (1965) and 1959–1963 (1967).

SUMMARY OF THE INVENTION

This invention comprises the amphoteric compound of the formula

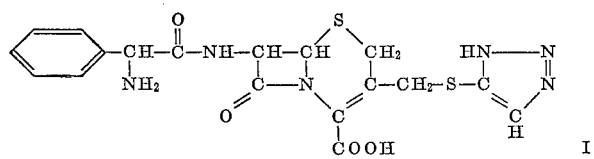

having the D configuration and existing primarily as the zwitterion, and its nontoxic pharmaceutically acceptable salts.

Such salts include the nontoxic carboxylic acid salts thereof, including nontoxic metallic salts such as sodium, potassium, calcium and aluminum, the ammonium salt and substituted ammonium salts, e.g. salts of such nontoxic amines as trialkylamines, including triethylamine, procaine, dibenzylamine, N-benzyl-beta-phenethylamine, 1-ephenamine, N,N' - dibenzylethylenediamine, dehydroabietylamine, N,N' - bis - dehydroabietylethylenediamine, N-(lower)-alkylpiperidine, e.g., N-ethylpiperidine, and other amines which have been used to form salts with benzylpenicillin; and the nontoxic acid addition salts thereof (i.e., the amines salts) including the mineral acid addition salts such as the hydrochloride, hydrobromide, hydroiodide, sulfate, sulfamate and phosphate and the organic acid addition salts such as the maleate, acetate, citrate, oxalate, succinate, benzonate, tartrate, fumarate, malate, mandelate, ascorbate and the like.

The amphoteric compound of the present invention is prepared according to the present invention by coupling with 7-amino-3-[S-(1,2,3-triazole - 5 - yl)-thiomethyl]-3-cephem-4-carboxylic acid (II) (or a salt or easily hydrolyzed ester thereof including those of U.S. Pat. 3,284,451 and any of the silyl esters described in U.S. Pat. 3,249,622 for use with 7-aminopenicillanic acid and used in Great Britain 1,073,530) a particular acid or its functional equivalent as an acylating agent for a primary amino group. After coupling, the blocking group is removed to give the desired product. Said acid has the formula

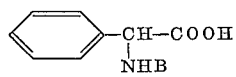

wherein B represents a blocking group of the type used either in peptide synthesis or in any of the numerous synthesis of α-aminobenzylpenicillin from 2-phenylglycine. Particularly valuable blocking groups are a proton, as in the cimpound of the formula

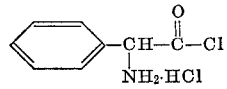

or a β-diketone as in Great Britain 1,123,333, e.g., methyl acetoacetate, in which case the acid containing the blocked amino group is preferably converted to a mixed anhydride, as with ethyl chloroformate, before reaction with compound II or a salt thereof to form the desired product I after acid cleavage.

Further to the discussion above of blocking groups used on the free amino group of the sidechain acid during its coupling with compound II, the blocking group is then removed to form the products of the present invention, e.g., the t-butoxy-carbonyl group is removed by treatment with formic acid, the carbobenzyloxy group is removed by catalytic hydrogenation, the 2-hydroxy-1-naphthacarbonyl group is removed by acid hydrolysis and the trichloroethoxycarbonyl group by treatment with zinc dust in glacial acetic acid. Obviously other functionally equivalent blocking groups for an amino group can be used and such groups are considered within the scope of this invention.

Thus, with respect to said acid to be used to couple with compound II, functional equivalents include the corresponding acid anhydrides, including mixed anhydrides and particularly the mixed anhydrides prepared from stronger acids such as the lower aliphatic monoesters of carbonic acid, or alkyl and aryl sulfonic acids and of more hindered acids such as diphenylacetic acid. In addition, an acid azide or an active ester or thioester (e.g., with p-nitrophenol, 2,4-dinitrophenol, thiophenol, thioacetic acid) may be used or the free acid itself may be coupled with compound II after first reacting said free acid with N,N'-dimethylchloroformiminium chloride [cf. Great Britain 1,008,170 and Novak and Weichet, Experientia XXI 6, 360 (1965)] or by the use of enzymes or of an N,N'-carbonyldiimidazole or an N,N']carbonylditriazole [cf. South African patent specification 63/2,684] or a carbodiimide reagent [especially N,N'-dicyclohexylcarbodiimide, N,N'-diisopropylcarbodiimide or N - cyclohexyl-N'-(2-morpholinoethyl)carbodiimide; cf. Sheehan and Hess, J. Amer. Chem. Soc., 77, 1067 (1955)], or of alkylylamine reagent [cf. R. Buijle and H. G. Viehe, Angew. Chem. International, Edition 3, 582 (1964)], or of a ketenimine reagent [cf. C. L. Stevens and M. E. Mond, J. Amer. Chem. Soc., 80, (4065)] or of an isoxazolium salt reagent [cf. R. B. Woodwar, R. A. Olofson and H. Mayer, J. Amer. Chem. Soc., 83, 1010 (1961)]. Another equivalent of the acid chloride is a corresponding azolide, i.e., an amide of the corresponding acid whose amide nitrogen is a member of an quasi-aromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield dimidazolide. The byproduct, imidazole, precipitates and may be separated and the imidazolide isolated, but this is not essential. The methods for carrying out these reactions to produce a cephalosporin and the methods used to isolate the cephalosporin so produced are well known in the art.

In the treatment of bacterial infections in man, the compounds of this invention are administered orally or parenterally, in accordance with conventional procedures for antibiotic administration, in an amount of from about 5 to 200 mg./kg./day and preferably about 5 to 20 mg./kg./day in divided dosage, e.g., three to four times a day. They are administered in dosage units containing, for example, 125 or 250 or 500 mg. of active ingredient with suitable physiologically acceptable carriers or excipients.

The dosage units are in the form of liquid preparations such as solutions or suspensions or as solids in tablets or capsules.

Exactly 200 g. of 7-aminocephalosporanic acid (7-ACA) was suspended in 500 ml. of acetone and a solution of 240 g. of p-toluenesulfonic acid in 500 ml. of acetone was added in one charge. After stirring for five minutes, at room temperature, the mixture was filtered through diatomaceous earth ("Super Cel") and the bed washed with 150 ml. of acetone (the insoluble matter weighed about 30 g.). Then 80 ml. of water was added to the filtrate and, while stirring, the p-toluene-sulfonate salt crystallized out after scratching on the inside of the flask with a glass rod. The suspension was stirred in an ice-salt bath for thirty minutes and filtered cold. It was washed with 2× 200 ml. of cold acetone (0° C.) and air dried; yield 250 g. of salt. This p-toluene-sulfonate salt of 7-ACA was stirred in 2 liters of methanol and the insoluble matter filtered through "Super Cel." The filtrate was placed in a five liter 3 neck flask and 2 liters of water were added. Then the pH was adjusted to 4 by the addition of concentrated ammonium hydroxide with cooling and the suspension stirred for one hour at 0° C. The product was collected by filtration and washed with 2× 100 ml. $H_2O$ (0° C.) and 3× 1 liter acetone (room temperature). After air drying, the yield of 7-ACA was 145 g.

Reference: Glaxo, British Pat. 1,104,938 (1968).

The following examples are given in illustration of, but not in limitation of, the present invention. All temperatures are in degrees centigrade. 7-aminocephalosporanic acid is abbreviated as 7-ACA and methyl isobutyl ketone as MIBK. "Skellysolve B" is a petroleum ether fraction of B.P. 60–68° C. consisting essentially of n-hexane.

DESCRIPTION OF THE PREFERRED EMBODIMENTS

Example 1

Sodium D-α-[1-carbomethoxypropen - 2 - yl)-amino]-phenylacetate.—Lit. ref. E. Dane, F. Oreis, P. Konrad, T. Dockner, *Angew. Chem. Intern. Ed. Engl.*, 1, 658 (1962); E. Dane and T. Dockner *Angew. Chem.*, 76, 342 (1964); Spencer, Flynn, Roeske, Sin and Chauvette, J. Med. Chem., 9, 746–50 (1966); U.S. Pat. 3,496,171 (Lilly).

To a well stirred mixture of 40 g. (1 mole) of NaOH in 40 ml. of $H_2O$ and one liter of benzene was added 151.6 g. (1 mole) of D-(−)-phenylglycine. The mixture was held at about 55° C. for 30 minutes and then with vigorous stirring 116 g. (1 mole) of methyl acetoacetate was added and the mixture stirred and heated at reflux until no more water was collected in the Dean-Stark trap. Next one liter of acetone was added with the heat removed and then the slurry was cooled and stirred 30 minutes in an ice-salt bath. The product was collected by filtration, washed well with copious amounts of acetone and air dried. Yield was 191 g., dec. pt. 252° C., $[\alpha]_D^{22° C.} +207°$ (C.=1% $H_2O$).

Synthesis of potassium 1,2,3-triazole-5-thiolate:

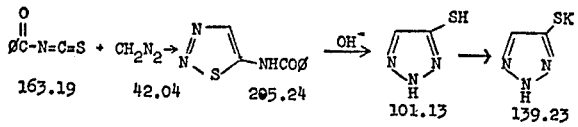

The synthesis of the thiol was accomplished by a procedure essentially identical to that described in the literature [J. Goerdler and G. Gnad, *Chem. Ber.* 99, 1618 (1966)].

5-benzamido-1,2,3-thiadiazole.—To a stirred solution of benzoylisothiocyanate (50.6 g., 310 mmoles) in commercial anhydrous ether (400 ml.), maintained at 0° and in a nitrogen atmosphere, was added dropwise with vigorous stirring, 0.685 N ethereal diazomethane (453 ml., 310 mmoles). When the addition was completed, the mixture was stirred for 1 hour at 0°, the solid was collected by filtration and dried *in vacuo*. The melting point of the crude material (23.3 g.) thus obtained was observed somewhere in the region 232 to 257°. Goerdler reported m.p. 267° for the pure material. A small second crop (2.1 g.) was obtained by evaporation of the mother liquor *in vacuo*. The total yield was therefore 40%.

1,2,3-triazole-5-thiol.—A solution of the above benamido compound (8.2 g., 40 mmoles) in 2N sodium hydroxide (80 ml., 160 mmoles) was heated under reflux temperature in a nitrogen atmosphere for 24 hours. The solution was cooled to 0° in ice, and concentrated hydrochloric acid (26 ml.) was added, while a continuous stream of nitrogen was passed through the solution. The benzoic acid which precipitated was collected by filtration; the filtrate was saturated with sodium chloride and the additional benzoic acid which separated was removed by filtration. The filtrate was immediately extracted with ethyl acetate, the extract was washed with saturated salt solution, dried over magnesium sulfate and then evaporated *in vacuo*. The viscous oil which remained was immediately evaporatively distilled *in vacuo* (70–75°/0.001 mm.) to give an oil (2.84 g., 70%) which solidified (m.p. 52–59°; Goerdler reported m.p. 60°) spontaneously.

Potassium 1,2,3-triazole-5-thiolate.—To a solution of the above thiol (2.84 g., 28.1 mmoles) in absolute ethanol (28 ml.) was added 1.93N alcoholic potassium hydroxide solution (14.5 ml.). The solution was then diluted with anhydrous ether until crystallization of the salt was completed. The solid was collected by filtration, washed with ether, and dried *in vacuo*. The salt obtained in this manner (3.65 g., 93%) had m.p. 225° with decomposition.

7-amino - 3 - [S-(1,2,3 - triazole-5-yl)-thiomethyl]-3-cephem-4-carboxylic acid (II).—Ten grams (0.075 mole) of 5-mercapto-1,2,3-triazole potassium salt was added to a stirred slurry of 19 g. (0.07 mole) of purified 7-aminocephalosporanic acid and 5.9 g. (0.07 mole) of $NaHCO_3$ in 350 ml. of 0.1M phosphate buffer (pH 6.4) and the mixture heated and stirred at 55° C. for 3½ hours under a nitrogen atmosphere. The resulting solution was cooled to 22° C. and the pH adjusted to 5.5 with 40% $H_3PO_4$. The resulting precipitate was filtered off, washed with cold water (50 ml.) and air dried. The yield of 7-amino-3-[S-(1,2,3-triazole-5-yl)-thiomethyl]-3-cephem - 4 - carboxylic acid was 8 g., dec. pt. 230° C. Ir analysis showed some decomposition of the β-lactam ring but it was used "as is" for the next step.

*Analysis.*—Calcd. for $C_{10}H_{11}N_5O_3S_2$: C, 38.39; H, 3.54. Found: C, 38.36; H, 3.78.

7-[D-α-amino - α - phenylacetamido]-3-[S-(1,2,3-triazole-5-yl) - thiomethyl]-3-cephem-4-carboxylic acid (I).—To a stirred suspension of 5.42 g. (0.02 mole) of sodium D-α-[1-carbomethoxypropen - 2 - yl)-amino]-phenyl acetate in 50 ml. of acetonitrile was added 2 drops of N,N-dimethylbenzylamine and the slurry cooled and stirred at −10° C. while 2.14 g. (0.02 mole) of ethyl chloroformate was added. After 20 min. at −10° C., a solution of 6.26 g. (0.02 mole) of 7-amino-3-[S-(1,2,3-triazole-5-yl)-thiomethyl]-3-cephem-4-carboxylic acid, 2.8 ml. (0.02 mole) of triethylamine, 40 ml. of acetonitrile, and 40 ml. of water, precooled to 0° C. was added, all at once, with vigorous stirring. After 45 min. at 0° C. the solution was saturated with salt (excess NaCl) for 15 min. The organic (top) layer was separated and to it there was added 40 ml. of water and the resulting solution concentrated, *in vacuo*, at 20° C. to a volume of about 50 ml. To this solution was added a solution of 70 ml. of methyl isobutyl ketone (MIBK) and 8 ml. of 90% formic acid. The mixture was first shaken and then stirred at 0° C. for 3 hours. The aqueous phase was then separated and then stirred 30 min. with a fresh 70 ml. portion of MIBK at 0° C. and separated again. The aqueous phase was then concentrated to near dryness at <20° C. under reduced pressure.

The residual oil was then titurated with acetonitrile until solid. The solids were collected by filtration, air dried, and then vacuum dried over $P_2O_5$ for 14 hours. The yield was 2.45 g. of 7-[D-α-amino-α-phenylacetamido]-3-[S-(1,2,3-triazole-5-yl)-thiomethyl]-3-cephem - 4 - carboxylic acid. This material by IR showed evidence of phenylglycine and starting II above in it as impurities. These were removed by dissolving the material in 25 ml. of water, filtering adjusting the pH to 1.5 with 40% $H_3PO_4$, adding 1 g. of "Darko KB" decolorizing carbon, stirring 10 min., filtering through diatomaceous earth ("Dicalite") filter aid and adjusting the pH to 3.5 with solid $NaHCO_3$. Next, the clear white solution was concentrated to a volume of about 15 ml. and the white precipitate collected by filtration, air dried and then vacuum dried over $P_2O_5$. The amorphous, water soluble product, 7-[D-α-amino-α-phenylacetamido]-3-[S-(1,2,3 - triazole-5-yl)-thiomethyl]-3-cephem - 4 - carboxylic acid, which weighed 500 mg., gave a completely consistent IR and NMR spectra and showed no evidence of any significant contamination. Elemental analysis showed 6.15% water by the Karl Fischer method and 1.61% sodium as residue.

It is important to note that the conversion of the benzamido thiadiazole to the triazole thiol is known to proceed via 5-amino-1,2,3-thiadiazole [G. Goerdler and G. Gnad, Chem. Ber., 99, 1618 (1966)].

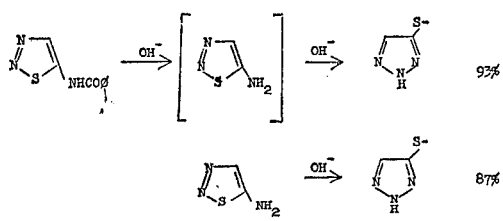

5-amino-1,2,3-thiadiazole can be prepared by an alternative route, not involving diazomethane [D. L. Pain and R. Slack, J. Chem. Soc., 5166 (1965)].

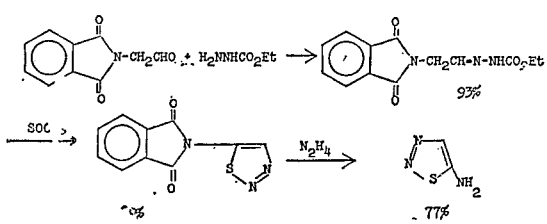

Example 2

7-amino-3-(1,2,3-triazol - 5 - ylthiomethyl)-3-cephem-4-carboxylic acid (II).—The reactions were conducted under a nitrogen atmosphere in a reaction vessel protected from light. The water and phosphate buffer were gassed vigorously with nitrogen prior to use to displace oxygen.

5-amino-1,2,3-thiadiazole (10.3 g., 0.102 mole) was added to a solution of 8.16 g. of sodium hydroxide in 100 ml. of water. The mixture was heated rapidly to reflux and then refluxed for 10 min. to rearrange 5-amino-1,2,3-thiadiazole to 5-mercapto-1,2,3-triazole. To the reaction mixture containing 5-mercapto - 1,2,3 - triazole cooled in an ice bath was added 1100 ml. of ice cold 0.1M pH 6.4 phosphate buffer. The solution, which was at pH 10.5, was adjusted to pH 8.5 with 42% phosphoric acid. 7-aminocephalosporanic acid (21.8 g., 0.08 mole) was added and the mixture heated at 50° for 4 hours. The clear solution was cooled in an ice bath and adjusted to pH 4.5 with conc. HCl. The precipitated product was collected by filtration, washed with water and air dried; 16.2 g.

The crude product (15.2 g.) was brought into solution with 600 ml. of methanol and 40 ml. of conc. HCl. After carbon treatment the solution was diluted with 1.5 l. of ice water and extracted once with ethyl acetate. The aqueous phase was concentrated at reduced pressure to remove methanol. The cold aqueous concentrate was adjusted slowly to pH 4.0 with 20% sodium hydroxide causing crystallization of the product. The product was collected by filtration, washed with water and methanol and dried in vacuo over phosphorus pentoxide; 11.4 g. The IR and NMR spectra were fully consistent for the desired product.

Analysis.—Calcd. for $C_{10}H_{11}N_5O_3S_2$: C, 38.42; H, 3.55; N, 22.40. Found: C, 38.27, 38.26; H, 3.76, 3.40; N, 21.02, 21.00; $H_2O$, 1.70.

Purification of 7 - amino-3-(1,2,3,-triazol-5-ylthiomethyl)-3-cephem-4-carboxylic acid (II).—Crude 7-amino-3-(1,2,3-triazol-5-ylthiomethyl)-3-cephem-4-carboxylic acid (16.1 g.) containing approximately 20 mole percent of 7-aminocephalosporanic acid as an impurity, was brought into solution with 600 ml. of methanol and 40 ml. of conc. HCl. After carbon treatment, the solution was diluted with 1.5 l. of ice water and extracted once with ethyl acetate. The aqueous phase was concentrated at reduced pressure to remove methanol. The cold aqueous concentrate was then adjusted slowly to pH 4.0 with 20% sodium hydroxide causing the product to crystallize. The product was collected by filtration, washed with water and methanol and dried in vacuo over phosphorus pentoxide; 11.4 g. The NMR spectrum indicated that this product contained about 7 mole percent of 7-aminocephalosporanic acid as an impurity.

The above purification procedure was repeated on 11.4 g. of the product using 425 ml. of methanol, 28 ml. of conc. HCl and 1 l. of ice water yielding 8.0 g. of product. The NMR spectrum was fully consistent for the desired product and indicated no trace of 7-aminocephalosporanic acid as an impurity.

Analysis.—Calcd. for $C_{10}H_{15}N_5O_3S_2$: C, 38.42; H, 3.55; N, 22.40. Found: C, 39.06, 38.53; H, 3.56, 3.51; N, 22.05, 21.60; $H_2O$, 1.78.

7 - amino-3-[S-(1,2,3 - triazole-5-yl)-thiomethyl] - 3-cephem-4-carboxylic acid (II).—Ten grams (0.075 mole) of 5-mercapto-1,2,3-triazole potassium salt was added to a stirred slurry of 19 g. (0.07 mole) of purified 7-amino-cephalosporanic acid and 5.9 g. (0.07 mole) of $NaHCO_3$ in 350 ml. of 0.1M phosphate buffer (pH 6.4) and the mixture heated and stirred at 55° C. for 3½ hours under a nitrogen atmosphere. The resulting solution was cooled to 22° C. and the pH adjusted to 5.5 with 40% $H_3PO_4$. The resulting precipitate was filtered off, washed with cold water (50 ml.) and air dried. The yield of 7-amino-3-[S-(1,2,3 - triazole-5-yl)-thiomethyl]-3-cephem-4-carboxylic acid was 8 g., dec. pt. 230° C. IR analysis showed some decomposition of the β-lactam ring but it was used "as is" for the next step.

Analysis.—Calcd. for $C_{10}H_{11}N_5O_3S_2$: C, 38.39; H, 3.54. Found: C, 38.36; H, 3.78.

7 - amino - 3 - (1,2,3 - triazol - 5 - ylthiomethyl) - 3-cephem-4-carboxylic acid (II).—Two hundred seventy-two g. (1.0 mole) of 7-amino-cephalosporanic acid was suspended in 3000 ml. of 0.1M phosphate buffer, pH 6.4, and 150 ml. of methyl isobutyl ketone followed by 84 g. (1.0 mole) of sodium bicarbonate was added in portions.). Then 143 g. (1.0 mole) of 5-mercapto-1(H)-1,2,3-triazole potassium salt was added and the mixture stirred at 55° C. ±1° C. under a nitrogen atmosphere for 4 hours. After 1 hr. the pH was readjusted to 6.4 by addition of a small amount of 40% $H_3PO_4$. At the end of the 4 hr. heating period, 50 g. of "Darco KB" decolorizing charcoal was added and, after stirred for 15 min. at 55° C., the slurry was filtered hot through a diatomaceous earth ("Celite") pad. The pad was washed with 3× 100 ml. water. The pH of the combined filtrates was adjusted while hot to 4.5 by slow addition of 6 N HCl. After cooling 30 min. at 0° C., the crude product was collected by filtration, washed with 2× 200 ml. cold water followed by 2× 1000 ml. methanol and air dried.

The crude product was suspended in 3000 ml. of 50% methanol-water and 300 g. (1.5 mole) of p-toluenesulfonic acid was added. It was stirred for 15 min. and then 50 g.

of "Darco KB" decolorizing charcoal was added. After stirring for 15 min. at 22° C., the slurry was filtered through a "Celite" pad and the pad washed with 2× 100 ml. of 50% methanol-water. The pH of the combined filtrates was adjusted to 4.0 by addition of approximately 210 ml. of triethylamine. After cooling at 0° C. for 1 hour the product was collected by filtration, washed with 2× 400 ml. 50% methanol-water and then 2× 1000 ml. methanol. It was air dried.

This material was suspended in 2000 ml. water and 84 g. (1 mole) of sodium bicarbonate was added. After stirring for 10 min. at 22° C., 50 g. of "Darco KB" charcoal was added and, after stirring for 15 min. at 22° C., the slurry was filtered through a "Celite" pad. It was washed with 2× 100 ml. water and the pH of the combined filtrates was adjusted to 3.5 by slow addition of 6 N HCl. After stirring for 10 min. at 22° C., it was cooled to 0° C. for 1 hr. The product was collected by filtration, washed with 2× 200 ml. cold water and 2× 1000 ml. acetone. After drying over $P_2O_5$ in a vacuum desiccator for 14 hr., at room temperature, the yield was 100 g.; dec. pt. 230° C. The IR and NMR were consistent for the desired structure.

*Analysis.*—Calcd. for $C_{10}H_{11}N_5O_3S_2 \cdot \frac{1}{2}H_2O$: C, 37.51; H, 3.75; N, 21.68; $KF(H_2O)$, 2.8. Found: C, 37.78; H, 3.69; N, 20.42; $KF(H_2O)$, 2.46.

I claim:
1. 7 - amino - 3 - [S-(1,2,3-triazole-5-yl)-thiomethyl]-3-cephem-4-carboxylic acid.
2. The sodium or potassium salt of the acid of claim 1.

References Cited
UNITED STATES PATENTS
3,516,997   6/1970   Takano et al. _____ 260—243 C NICHOLAS S. RIZZO, Primary Examiner U.S. Cl. X.R.
260—243 C